(12) United States Patent
Cameron

(10) Patent No.: US 7,651,652 B1
(45) Date of Patent: Jan. 26, 2010

(54) PRINT PAD AND METHOD OF MANUFACTURE

(76) Inventor: Robert Cameron, 3245 W. Bellwood La., Glenview, IL (US) 60025

(*) Notice: Subject to any disclaimer, the term of this patent is extended or adjusted under 35 U.S.C. 154(b) by 145 days.

(21) Appl. No.: 11/823,785

(22) Filed: Jun. 28, 2007

Related U.S. Application Data

(60) Provisional application No. 60/831,716, filed on Jul. 18, 2006.

(51) Int. Cl.
  *B29C 43/22* (2006.01)
  *B29C 33/40* (2006.01)
(52) U.S. Cl. .................. 264/274; 264/227
(58) Field of Classification Search ............ 264/227, 264/274
  See application file for complete search history.

(56) References Cited

U.S. PATENT DOCUMENTS

| | | | |
|---|---|---|---|
| 1,332,169 A * | 2/1920 | Ellis ........................ 264/46.4 |
| 2,446,213 A * | 8/1948 | Clark et al. ................. 264/274 |
| 3,380,380 A * | 4/1968 | Funahashi .................. 101/379 |
| 3,408,436 A * | 10/1968 | Cubitt ........................ 264/225 |
| 4,889,421 A | 12/1989 | Cohen |
| 5,034,166 A | 7/1991 | Rawlings |
| 5,120,121 A | 6/1992 | Rawlings |
| 5,452,658 A * | 9/1995 | Shell ........................ 101/401.1 |
| 5,637,265 A * | 6/1997 | Misciagno et al. ............ 264/1.7 |
| 6,054,189 A * | 4/2000 | Bravet et al. ................. 427/491 |
| 6,099,379 A | 8/2000 | Eppley |
| 6,123,021 A * | 9/2000 | Cameron ...................... 101/41 |
| 6,196,683 B1 | 3/2001 | Quinn |
| 6,231,183 B1 | 5/2001 | Dillon |
| 6,979,419 B2 * | 12/2005 | Cameron ..................... 264/220 |
| 7,255,438 B2 * | 8/2007 | Atkins et al. ................ 351/177 |
| 2003/0173704 A1 * | 9/2003 | Cameron ..................... 264/219 |

* cited by examiner

*Primary Examiner*—Joseph S. Del Sole
*Assistant Examiner*—David N Brown, II
(74) *Attorney, Agent, or Firm*—Robert L. Marsh

(57) ABSTRACT

A print pad for printing on a concave surface is molded to the forward surface of a cylindrical base. The base has a cavity therein and at least one hole extending from the forward surface thereof to the cavity. The print pad is made by filling a female mold with liquid polymer and positioning the forward surface of the base against the rear of the mold. Excess liquid polymer from the mold flows through the hole and into the cavity. As the polymer cures it contracts and draws liquefied polymer out of the cavity so that the cured print pad is not deformed.

4 Claims, 4 Drawing Sheets

PRINT PAD AND METHOD OF MANUFACTURE

The applicant claims priority from his provisional application filed Jul. 18, 2006 and assigned Ser. No. 60/831,716. The present invention relates to print pads of the type used to print on a concave surface of a mold used to form a contact lens.

BACKGROUND OF THE INVENTION

It has become common to print the design of an iris of an eye on the surface of a contact lens so as to change the color of the eyes of one wearing the contact lenses. The colorings that make up the human eye are concentrated in numerous radially extending strands with various shades of color in the strands. In order to have the appearance of a natural eye, the pigments must be applied in narrow radially outwardly extending strands similar to the strands of pigment in the eye.

The inks that apply the pigment to the contact lens may be applied to the outer surface of the lens after the lens is manufactured, or may be printed on the concave inner surface of a mold used to manufacture the lens such that when the lens is withdrawn from the mold, the pigment is already imbedded into the convex outer surface of the lens. To apply a colored ink to the concave surface of a mold used to form a lens, the ink is applied by a compressible print pad having a precisely contoured outer surface that deforms as the pad is compressed against the concave surface so as to apply printing across the entire concave surface of the mold.

The outer surface of a print pad used to apply printing to the concave surface of such a mold must also be highly polished in order that the fine lines of color printing be released from the surface of the pad after the surface of the print pad is withdrawn. A print pad useable for printing the design of an eye to the concave surface of a mold, therefore, must be precisely shaped and have a highly polished outer surface.

The manufacturers of print pads have had difficulty obtaining the degree of polish needed and the precise body contour required for such a print pad. Once manufactured, the print pads are therefore carefully checked to insure that the print pad as manufactured has the desired contour and degree of polish. A very high percentage of the print pads manufactured are discarded as failing to meet the required standards. It is desirable, therefore, to provide a method of uniformly manufacturing print pads that meet very high standards with respect to contour and polish.

SUMMARY OF THE INVENTION

Briefly, the present invention is embodied in a method of manufacturing a print pad where the print pad includes a print pad body made of a compressible material such as a polymer and a rigid base for retaining the print pad to a machine. In accordance with the method, a male mold is provided in the shape of the desired print pad. The contour of the male mold must be carefully checked to confirm that it conforms to the exact contour required to maximize the application qualities of the print pad. The outer surface of the male mold is also polished to a shine such that even under a high magnification, the surface of the male mold is smooth. The male mold is then used to form a female mold using an injection molding process.

The injection molded female mold has a generally bulbous forward portion, the inner portions of which are complementary to the bulbous end of the print pad body, and rearward of the bulbous end is a generally frustoconical midportion ending in an annular rearward end. The female mold also has an annular flange extending radially outward around the circumference of the rearward end, and extending rearwardly of the rearwardly surface of the annular flange is a rearwardly extending annular ridge.

To form the female mold, including the annular flange and the rearwardly facing annular ridge, a parent female mold of the type required for injection molding is formed having a cavity corresponding to the outer surfaces of the female mold needed to form the print pad body. This parent female injection mold therefore has an annular radially extending groove corresponding to the radially extending flange of the female mold formed therein, and a rearwardly extending annular cavity complementary to the rearwardly extending ridge of the female mold needed to form the print pad. The parent female mold is then used as an injection mold to form the female mold.

To manufacture the print pad, the female mold is positioned with the open end of the female mold extending upwardly and the bulbous cavity portion extending downwardly. Thereafter, the mold is filled with a liquid polymer of the type that will harden to form the body of a print pad. The mold is filled until the liquid overflows the rearwardly extending annular ridge. After excess liquid poured into the mold has flowed away from the annular ridge, surface tension will retain a bubble of liquefied polymer above the annular ridge surrounding the rearward opening of the female mold. Thereafter a base is provided having a planar forward surface and having a cavity extending into the rearward end of the base. At least one hole extending through the forward surface to the cavity within. The base is then positioned with the forward surface applied against the rearwardly extending flange of the female mold. When the base is positioned against the rearwardly extending tubular flange, excess liquid in the female mold will pass through the hole and enter the cavity within the base.

The liquefied polymer is then allowed to harden into a mass. As the liquefied material hardens, it contracts, and as the liquid contracts, some liquid is withdrawn from the cavity in the base through the hole and into the body of the female mold. As a result, the hardened polymer retains the exterior contour of the inner shape of the female mold. Also, since the female mold has been manufactured from a male mold having a polished outer surface, the inner surface of the female mold is also highly polished and print pads formed in the female mold have a highly polished surface.

Once the liquefied polymer has hardened into a mass, the print pad body will be formed to the surface of the base. The base with the print pad body attached thereto can thereafter be removed from the mold and the manufactured print pad will have the desired contour and polish required to apply inks to the concave surfaces of a mold for making a contact lens.

BRIEF DESCRIPTION OF THE DRAWINGS

A better understanding of the present invention will be had after a reading of the following detailed description taken in conjunction with the drawings wherein.

DETAILED DESCRIPTION OF THE INVENTION

Figure 1:
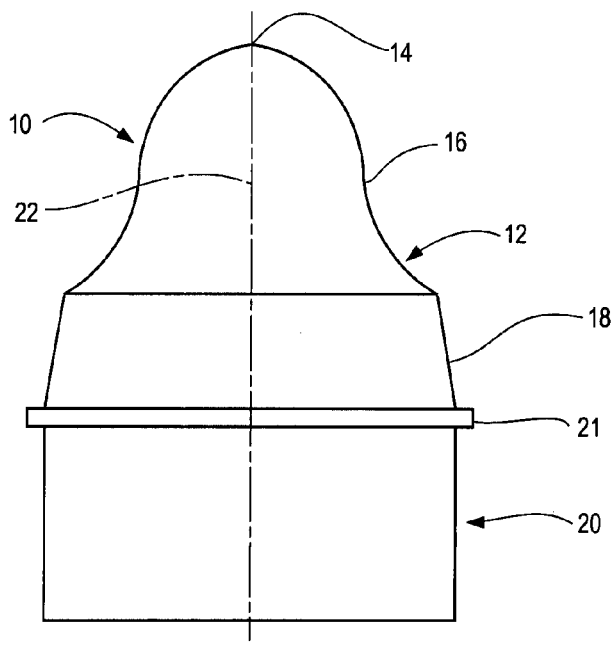
FIG. 1 is a side view of a print pad in accordance with the invention.

Referring to FIG. 1, a print pad 10 made in accordance with the present invention has a body 12 made of a suitable polymer and includes a bulbous forward end 14 and behind the bulbous forward end a bell shaped midsection 16 and a frustoconical rearward end 18. The body 12 is molded to a cylindrical plastic base 20 and the body 12 and base 20 are symmetric about a longitudinal axis 22. The base 20 has a radially outwardly extending annular flange 21 around the forward end thereof that extends radially outward of the largest diameter of the body 12. The base is shaped to be received in a retainer of a printing machine, not shown, that applies the bulbous forward end 14 of the body 12 against a concave surface of a mold, also not shown, for manufacturing a contact lens having printing to the surface thereof.

When the print pad 10 is inserted into a machine, the print pad 10 is retained with the base 20 extending upward where it is received in a retainer, not shown, with the bulbous forward end 14 extending downwardly. The bulbous forward end 14 also extends downwardly when the body 12 of the print pad 10 is being manufactured as described herein. Even though the print pad 10 is oriented with the bulbous end 14 directed downwardly both while it is manufactured and while it is in use, for the purpose of this discussion the various parts of the print pad 10 will be described as being directed forwardly, when directed towards the bulbous end 14, and directed rearwardly when directed towards the base 20. In similar fashion, the parts of the various molds used to make the body 12 of the print pad 10 will also be described as having forward parts that are positioned adjacent the forward end 14 of the print pad body 12 and as having rearward parts that are adjacent the frustoconical rearward end 18 of the body 12.

Figure 3:
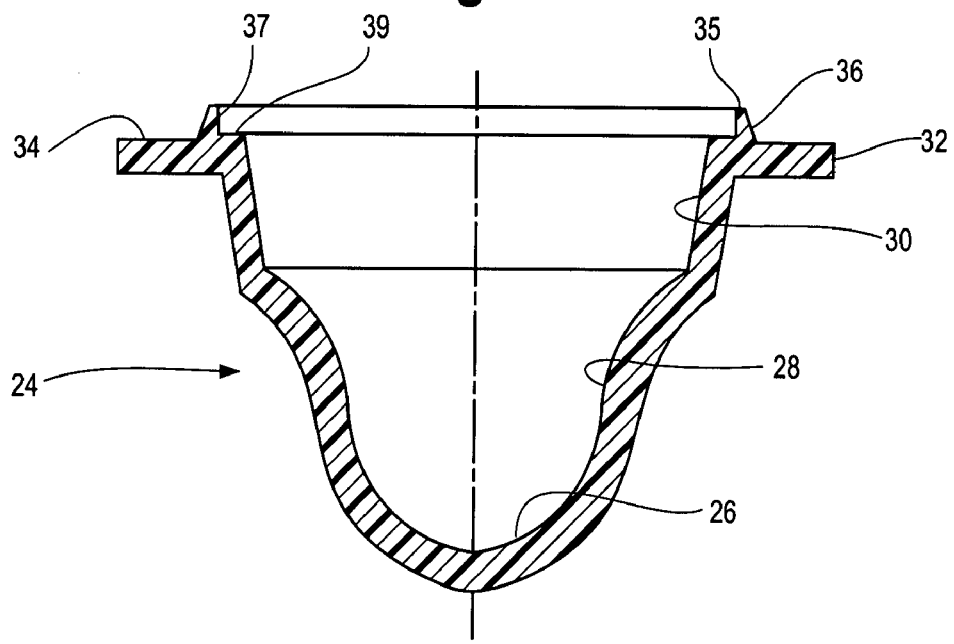
FIG. 3 is a cross-sectional view of a female mold manufactured from the injection mold shown in FIG. 2.

Referring to FIG. 3, the body 12 is formed in a unitary plastic female mold 24, the forward end 26 of which has a cavity therein shaped complementary to the bulbous forward end 14 of the body 12. Rearward of the forward end of the cavity 26, is a tapered midsection 28, the interior of which is shaped complementary to the midsection 16 of the body 12, and a more rearward frustoconical portion 30 having inner walls complementary to the outer surfaces of frustoconical rearward end 18 of the body 12. At the rearward end of the mold 24 is a radial flange 32 that extends radially outward of the frustoconical portion 30. The radial flange 32 has a planar rearward surface 34, and extending rearwardly of the planar rearward surface 34 is a rearwardly extending annular ridge 36. The rearwardly extending tubular ridge 36 has a circular rearward edge 35 that defines a plane perpendicular to the rotational axis 38 of the mold 24. The tubular ridge 36 has a cylindrical inner surface 37 having an inner diameter a little larger than the diameter of the annular flange 21 at the forward end of the base 20. Also, a short distance forward of the rearward edge 37 and along the inner surface of the mold 24 is an annular shoulder 39 that extends between the inner opening of the tubular portion 36 and the rearward end of the frustoconical portion 30.

Figure 7:
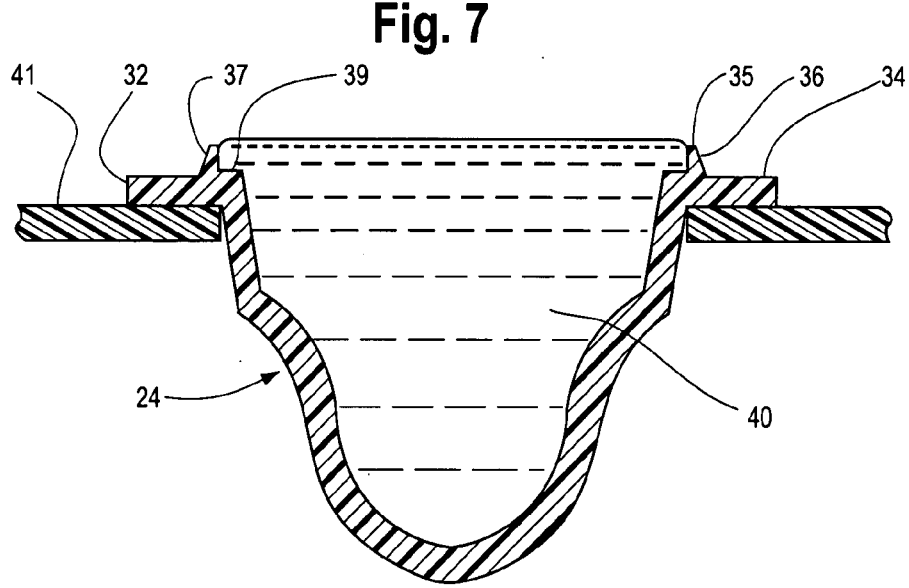
FIG. 7 is a cross-sectional view of the female mold shown in FIG. 3 filled with a liquid polymer until the liquid overflows the mold.

Referring to FIG. 7, when the mold 24 is used to form the body 12 of the print pad 10, the mold 24 is positioned on a retainer 41 with the planar surface 34 oriented horizontally and directed upwardly and the longitudinal axis 38 extending vertically. Liquefied polymer 40 is then poured into the cavity of the mold 24 until the polymer 40 overflows over the annular rearwardly extending ridge 36. Excess liquid 40 that overflows over the edge 35 of the ridge 36, then falls away from the ridge 36 to the planar surface 34 and flows away from the mold 24. The surface of the liquefied polymer 40 left in the mold mounds above the rearward ridge 36 because of the surface tension of the liquid.

Figure 4:
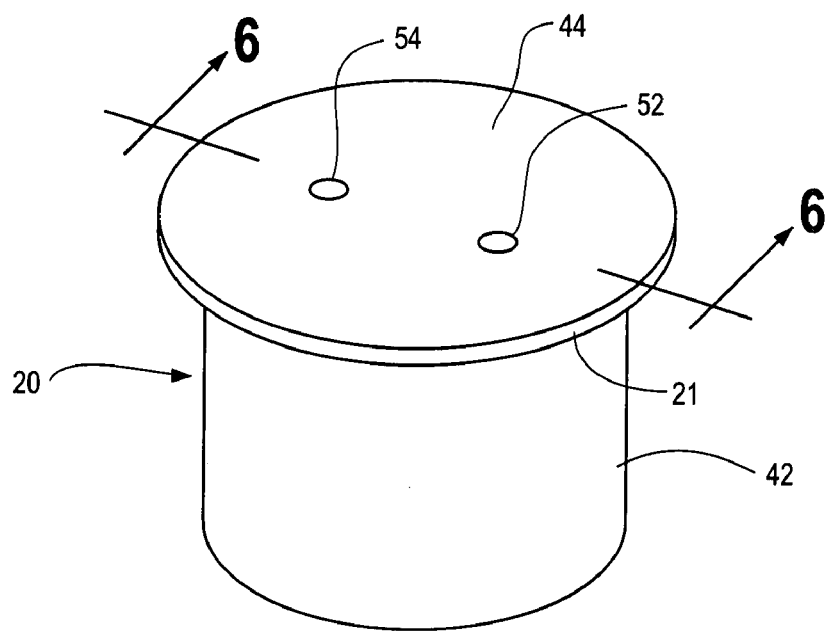
FIG. 4 is an isometric view of a base for the print pad shown in FIG. 1.
Figure 5:
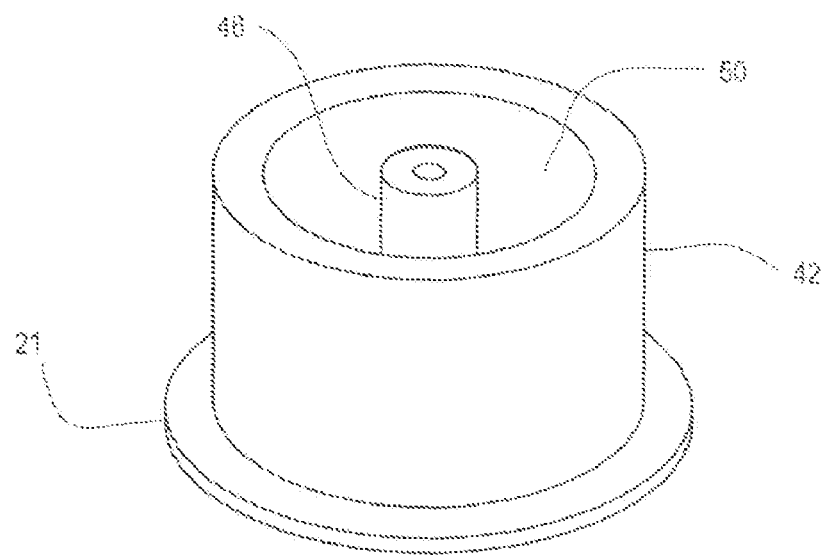
FIG. 5 is a second isometric view of the base shown in FIG. 4.
Figure 6:
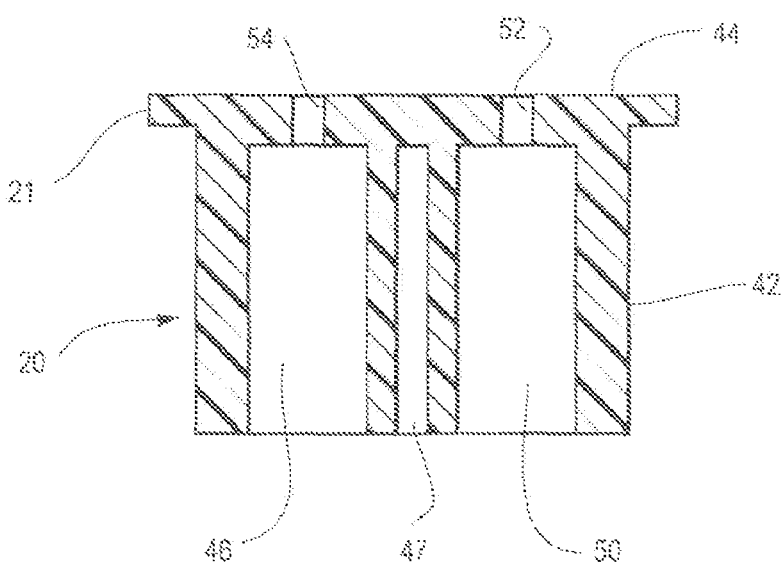
FIG. 6 is a cross-sectional view of the base shown in FIG. 4.

Referring to FIGS. 4, 5, and 6, the base 20 for assembly to the body 12 has a tubular outer body 42 and across one end of the tubular outer body 42 is a planar forward surface 44. A tubular retainer 46 extends axially through the center of the tubular outer body 42 and the central opening 47 of the tubular retainer 46 is closed at the forward end. The open rearward end of the tubular retainer 46 receives a retaining screw for retaining the base to a printing machine, not shown. Between the inner wall of the tubular outer body 42 and the outer wall of the tubular retainer 46 is an annular cavity 50, the rearward end of which is open to the ambient. A pair of diametrically spaced transverse holes 52, 54 extend through the planar forward surface 44 and into the annular cavity 50.

Figure 8:
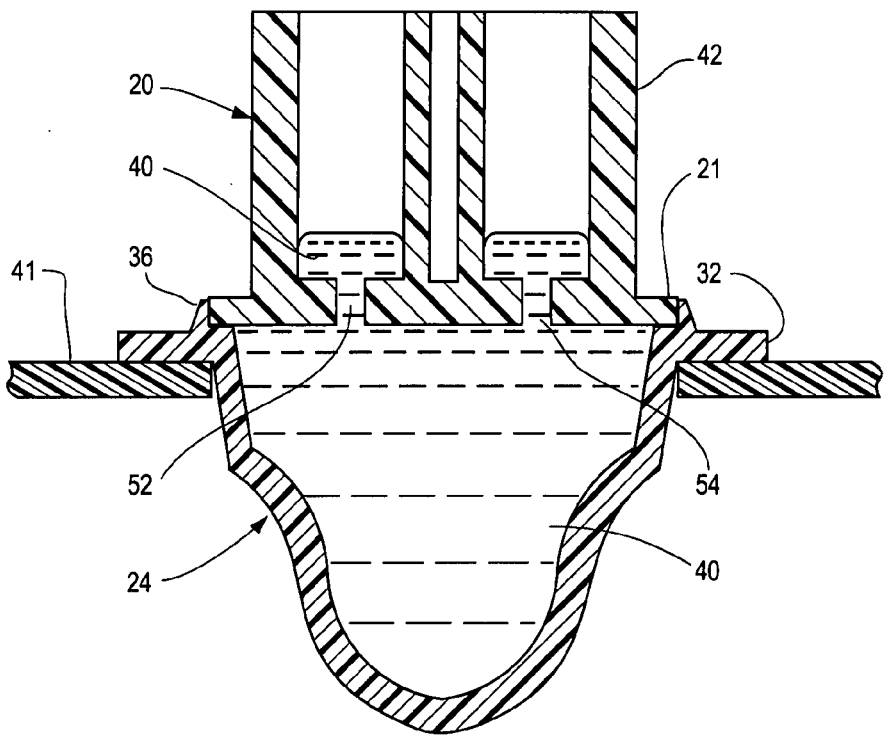
FIG. 8 is a cross-sectional view of the mold and polymer shown in FIG. 8 after the base shown in FIG. 4 has been positioned across the open end thereof.

Referring to FIGS. 7 and 8, once the female mold 24 has been filled with liquefied polymer as depicted in FIG. 7, the base 20 is positioned across the open end of the mold 24 with the annular flange 21 fitted into the cylindrical surface 37 within the tubular ridge 36 and the planar forward surface 44 against the annular shoulder 39. As the planar forward surface 44 is positioned against the annular shoulder 39, excess liquid mounded up over the open end of the mold 24 enters through the transverse holes 52, 54 and flows into the cavity 50. With the forward surface 44 of the base 20 positioned tightly against the annular shoulder 39 of the mold 24, the liquid polymer 40 is allowed to harden and cure. As the polymer 40 hardens, it contracts. As the polymer contracts, it applies a contractive force throughout the polymer. Simultaneously, atmospheric pressure applies force to the polymer in the open end of the cavity 50 and urges excessive liquid in the cavity 50 through the transverse holes 52, 54 and into the cavity of the mold 24. As the polymer shrinks the outer surfaces of the print pad body 12 formed within the mold 24 do not become deformed because polymer from the cavity 50 compensates for the shrinkage that occurs as the polymer cures. The holes 52, 54 between the forward surface 44 and the cavity 50 enable the polymer 40 of the print pad 10 to shrink without causing the outer surface of the polymer to pull away from the surface of the female mold 24 and thereby avoid deformities in the formed print pad 10. After the polymer 40 is hardened, the body 12 of the print pad 10 can be withdrawn from the female mold 24.

As can be seen, a critical element to the manufacture of the print pad 10 is the forming of the female mold 24. Female molds used to manufacture print pads in accordance with the prior art are manufactured using a thermal molding process. The inner surfaces of molds used in a thermal forming process must be manually polished, however, manual polishing of the inner surfaces of a mold frequently results in the mold being deformed such that it no longer retains the precise configuration required of a print pad used to print on the concave surface of a contact lens mold. The result is that many molds made using a thermal molding process must be discarded. This problem is avoided where the female mold 24 is injection molded.

Figure 2:
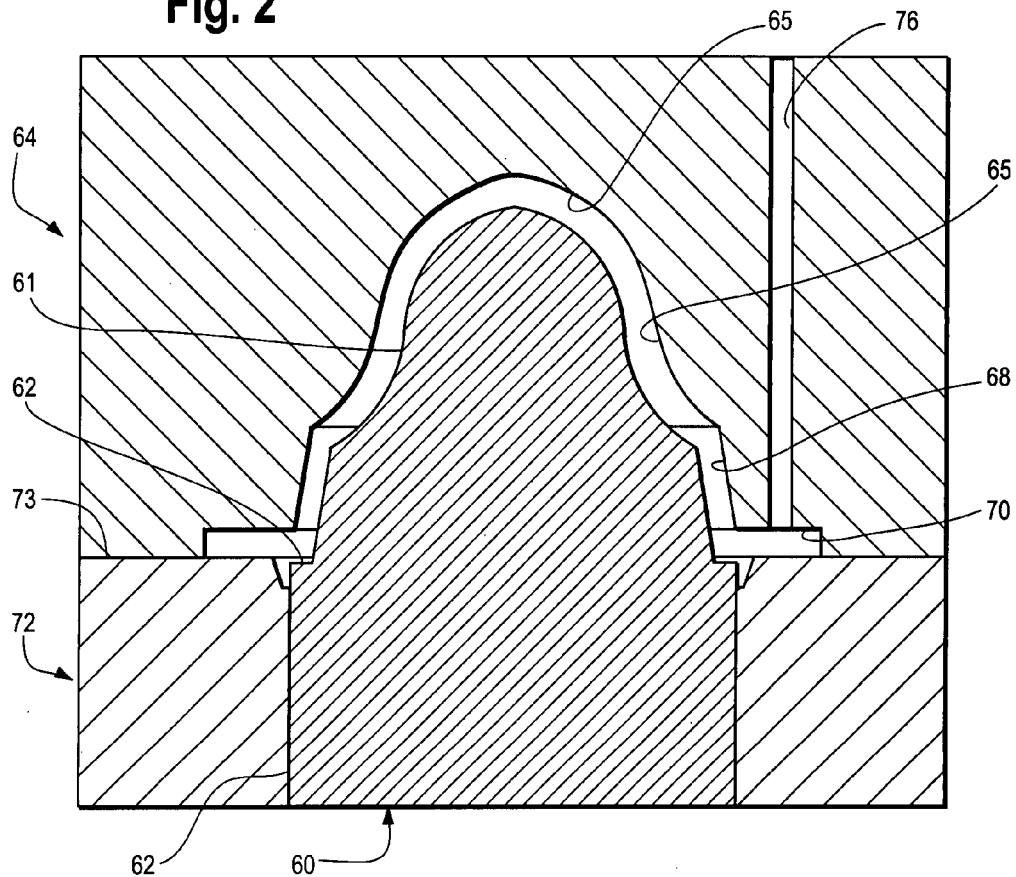
FIG. 2 is a cross-sectional view of a pair of injection molds used to form a female mold needed to make the print pad shown in FIG. 1.

Referring to FIG. 2, the mold 24 employed in the present invention is manufactured using a injection molding process in which a male mold 60 is formed with the forward end 61 having an outer surface exactly as described with respect to the outer surface 14, 16, 18 of the print pad body 12. Rearward of the forward end 61 is a cylindrical rearward end 62 having an outer diameter equal to the inner diameter of the tubular ridge 36 of the finished mold 24, leaving an annular shoulder 63 between the forward end 61 and the rearward end 62. The outer surface of the forward end 61 of the mold 60 is also highly polished. It should be appreciated that the outer surface of male mold 60 can be highly polished without disturbing the contour of its outer surface. In the injection molding process, the male mold 60 is spaced from and generally surrounded by a parent female mold 64 having an inner cavity with a forward end 65 that is complementary to the outer surface of the forward end 26 of the mold 24. The mold 64 also has a midsection 66 that is generally complementary to the outer surface of the midsection 28 of mold 24, and a rearward portion 68 complementary to the outer surface of the rearward portion 30 of mold 24. The mold 64 also has an annular shoulder 70 complementary to forward surface 34 of the radial flange 32 of the mold 24. An annular plate 72 extends around the rearward end of the mold 64 and has a surface 73 complementary to the planar annular surface 34 of the mold 24, and a central opening 74 the inner contour of which is complementary to the annular ridge 36 of the mold 24. The mold 62 also has a suitable access port 76 through which liquefied plastic, not shown, is injected to fill the inner cavity of the parent mold assembled from the various parts 60, 64, 72. The liquefied plastic is then allowed to harden after which the completed female mold 24 is removed.

While the present invention has been described with respect to a single embodiment, it will be appreciated that many modifications and variations may be made without departing from the true spirit and scope of the invention. It is therefore the intent of the appended claims to cover all such modifications and variations that fall within the true spirit and scope of the invention.

What is claimed:

1. The method of manufacturing a print pad having a print pad body and a base comprising the steps of
    forming a male mold of said print pad body,
    using said male mold to form a female mold using an injection molding process, wherein said female mold has an outwardly extending radial flange, and a rearward open end,
    positioning said female mold with an open end thereof extending upwardly,
    filling said female mold with a liquid polymer that will harden to form said print pad body wherein said female mold is filled until it overflows said upwardly extending open end,
    providing a base having a rearwardly extending cavity, a forward surface and at least one hole extending from said forward surface to said cavity,
    said rearwardly extending cavity being open to the ambient
    positioning said forward surface of said base against said open end wherein excess liquid in said female mold will flow through said hole and into said cavity,
    allowing said liquid to contract and harden, to form said print pad body to said upper surface, and
    removing said print pad body from said female mold.

2. The method of claim 1 and comprising the further step of polishing an outer surface of said male mold.

3. The method of manufacturing a print pad having a print pad body and a base comprising the steps of
    forming a female mold of said print pad body wherein said female mold has a rearward open end,
    positioning said female mold with said rearward open end extending upwardly,
    filling said female mold with a liquid polymer that will harden to form said print pad body of a print pad wherein said female mold is filled until it overflows said rearward open end,
    providing a base having a rearwardly extending cavity, a forward surface and at least one hole extending from said forward surface to said cavity,
    said rearwardly extending cavity being open to the ambient,
    positioning said forward surface of said base against said rearward open end wherein excess liquid polymer in said female mold will flow through said hole and into said cavity,
    allowing said liquid polymer to harden and contract to form said print pad body to said forward surface wherein liquid polymer will flow from said cavity and through said at least one hole to compensate for shrinkage of said polymer as it hardens, and removing said print pad body from said female mold.

4. The method of manufacturing a print pad having a print pad body and a base comprising the steps of
    forming a female mold of said print pad body wherein said female mold has a rearward open end,
    positioning said female mold with said rearward open end extending upwardly,
    filling said female mold with a liquid polymer that will harden to form said print pad body of a print pad wherein said female mold is filled until it overflows said rearward open end,
    providing a base having a body, a forward surface and at least one hole extending through said body with a first open end opening into said forward surface, and a second open end,
    positioning said forward surface of said base against said rearward open end wherein said second open end is open to the ambient and excess liquid polymer in said female mold will flow into said at least one hole,
    allowing said liquid polymer to harden and contract to form said print pad body to said forward surface wherein liquid polymer will flow from said at least one hole to compensate for shrinkage of said polymer as it hardens, and
    removing said print pad body from said female mold.

* * * * *